US006233834B1

(12) United States Patent
Walsh

(10) Patent No.: US 6,233,834 B1
(45) Date of Patent: May 22, 2001

(54) MINIATURE TRANSFORMERS FOR MILLIMACHINED INSTRUMENTS

(75) Inventor: Joseph G. Walsh, Cambridge, MA (US)

(73) Assignee: Milli Sensor Systems & Actuators, West Newton, MA (US)

( * ) Notice: Subject to any disclaimer, the term of this patent is extended or adjusted under 35 U.S.C. 154(b) by 0 days.

(21) Appl. No.: 09/257,068

(22) Filed: Feb. 24, 1999

Related U.S. Application Data

(60) Provisional application No. 60/075,840, filed on Feb. 24, 1998.

(51) Int. Cl.[7] ............................... G01B 7/30; H01F 27/28

(52) U.S. Cl. ......................... 33/1 PT; 336/174; 336/175; 336/182

(58) Field of Search .................................... 33/1 PT, 1 N, 33/534; 336/174, 173, 175, 182

(56) References Cited

U.S. PATENT DOCUMENTS 1,866,751 * 7/1932 Butow .
3,665,356 * 5/1972 Douglas et al. ..................... 336/175
5,263,258 * 11/1993 Dobler et al. ........................ 33/1 PT
5,266,916 * 11/1993 Kijima ................................ 336/182
5,319,342 * 6/1994 Kuroki ................................ 336/182
5,691,686 * 11/1997 Ishikawa et al. .................... 336/175
5,737,211 * 4/1998 Hirai et al. .
6,016,605 * 1/2000 Hecht .................................. 33/1 PT

* cited by examiner

*Primary Examiner*—Christopher W. Fulton
(74) *Attorney, Agent, or Firm*—Brian M. Dingman

(57) ABSTRACT

This invention relates to the planarization of inductive components by reducing standard coiled designs to single turn designs from which the required parameters are obtained by scaling the length. Single turn designs having magnetic material encircling the conductors along their full length enable the thinnest form. The single turn form also enables the inductive component to be routed according to any shape in the plane or on any conformal surface. The single turn inductors do not need to coil hence there is no overlap necessary in the plane. The planar form allows integration of inductive components with integrated circuits. These inductive components can be embedded in other materials. They can also be fabricated directly onto parts. The differential current transformer by virtue of its fabrication next to a capacitive pick-off enables the preservation of the purity of the signal obtained by taking signal differences close to the transducer and minimizing pick-up from leads.

17 Claims, 7 Drawing Sheets

*PRIOR ART*

Figure 6 Close up of cell structure

MINIATURE TRANSFORMERS FOR MILLIMACHINED INSTRUMENTS

CROSS REFERENCED TO RELATED APPLICATION

This application claims benefit of Provisional application Ser. No. 60/075,840, filed on Feb. 24, 1998.

STATEMENT OF FEDERALLY SPONSORED RESEARCH AND DEVELOPMENT

This invention was made with Government support under contract number DTRA01-99-C-0186 awarded by BMDO. The Government has certain rights in the invention.

BACKGROUND OF THE INVENTION

There are families of sensors such as gyros and accelerometers which require the angle measurement of a rotating member for their output. A schematic representation of a typical rotating member 10 is shown in FIG. 1 in a differential arrangement of capacitive plates 11.

Capacitive sensors are used because of their low noise characteristics, size, stable dimensions, and potentially very small gaps. Noise levels on the order of 10 nano-radians at a bandwidth of 100 hertz are possible.

The major limiting factor in the performance of capacitive pick-offs is the effects of stray capacitance pickup on the electronic circuitry which handles the rotation signal. This is particularly true when the capacitive values are on the order of a few pico-farads as they are in small gyros and accelerometers fabricated by micro- and milli-machining technologies. A solution is to couple the capacitive transducer 12 to a differential transformer 13. The capacitor pairs are tied in parallel with outputs connected to opposite ends of a transformer primary with a center tap to ground.

FIG. 2*a* illustrates the full tilt pick-off which includes the capacitive plates 12, the Differential Current Transformer (DCT) 13 and current to voltage electronics 14. FIG. 2*b* illustrates the full tilt pick-off which includes the capacitive plates 15, the planar DCT 16 and current to voltage electronics 17.

In the DCT, two currents flow to a common tap to ground. When the capacitive transducer is tilted, one of the currents becomes greater than the other and a current is induced in the secondary. The resultant current is converted to a voltage using an operational amplifier.

It is desired to locate the differential current transformer (DCT) next to the capacitive plates in order to take the current difference at the signal source and amplify it before capacitive noise pick-up in the leads can become a problem.

For miniature, essentially planar devices which are fabricated with an assembly of planar layers, it is desirable for the DCT to also have a planar form so that it can either be formed or be placed next to the transducer. At this time custom-wound ferrite cores are used. Their shape and size make it difficult to place it sufficiently close to the transducer. In addition, the core winding leads are susceptible to pick-up themselves.

The planar transformer approach will allow inductive components to be fabricated directly onto parts in many applications. The prospect of integration with IC chips and package structures may replace the current approach of pick and placement of wound cores onto parts, and would result in a much more cost effective approach.

The planar MilliDCT technology provides paths to the design and manufacture of a wide range of inductive components, (such as power transformers, isolation transformers, chokes, filters, mixers, etc.), which have smaller footprints, flatter profiles, lower weight, lower manufacturing cost, and greater potential for integration than is possible with existing, machine-wound inductive coils.

In addition to angular detection, translations can also be measured with a suitable differential configuration of capacitive plates.

Traditional Approach to Planar Transformers

Planar transformer designs using MEMS (Microelectromechanical Systems) technologies have been published. FIG. 3 shows a toroidal concept 26 which is representative of the state of the art. It consists of a magnetic core in the shape of a thin circular ring 22 sandwiched by polyimide electrical insulators 21, 23. To form a DCT, this assembly is encircled by three coils 20, 24, two primaries and one secondary (detail not shown) with the condition that the primaries are matched.

The fabrication approach involves the electroplating of the magnetic and conductor materials using patterning by photolithography. A monolithic approach with processes performed at each layer till the full device is formed.

Since the figure is of a blow-up of the concept, it is understood that the lower 24 and upper 20 conductors are connected so that the coils spiral around the core.

Parameter requirements are for: (1) near unity coupling between the primary and secondary coils, (2) coil inductance, (3) conductor resistances and (4) quality factor, Q.

Induction calculations assume that the flux flows across the full cross-sectional area of the core which is encircled by the winding turn. However, with increasing operational frequency, the rate of change of flux with time increases, generating a current in the magnetic material which in turn forms its own flux that tends to oppose the original. The currents are called eddy currents. Unlike the conductive windings which are wound outside the material, however, the eddy currents occur at all radii inside the volume of the material. The net effect is that the flux is the maximum at the center and decreases with distance from it. Therefore with increasing frequency, the flux at the center is cancelled and eventually can be eliminated from the bulk. With further increase in frequency a condition occurs where flux only flows within a skin-depth of the surface. To get around the problem, the magnetic core is laminated in thinner dimensions on the order of the skin depth. The number of windings also determine the inductance.

The difficulties with this approach are numerous:

1. Multi-layering of coils is impractical in comparison to ferrite core transformers; essentially limited to one layer in this planar design.
2. The number of coil turns is limited by the aspect ratio of the fabrication process otherwise a short can occur between them.
3. In order to connect each set of upper and lower conductor segments, the alignment of subsequent masks needs to be extremely precise. For each winding turn, 4 connections are required.
4. The interface between each conductor connection needs to be clean in order to minimize the electrical resistance.
5. The matching between the coils is affected by 2–4 of this list.
6. The Q is affected by 1–4 of this list.
7. The induction is affected by 1–3 of this list.
8. Leakage flux occurs since the windings do not totally enclose the magnetic core.

All the difficulties indicate an expensive and difficult process. Very high aspect processes like LIGA are necessary. In addition the difficulties mentioned limit how small the DCT can be made.

BRIEF DESCRIPTION OF THE DRAWINGS

Other objects, features and advantages will occur to those skilled in the art from the following descriptions of the preferred embodiments, and the accompanying drawings, in which.

DESCRIPTION OF THE PREFERRED EMBODIMENTS OF THE INVENTION

Differential Current Transformer

Figure 1:
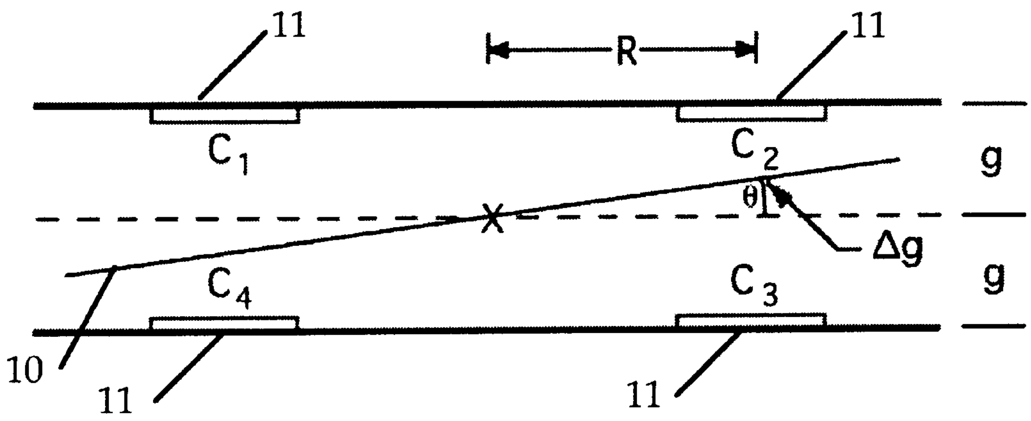
FIG. 1 is a schematic representation of a rotating member placed between a differential arrangement of parallel capacitor plates (a capacitive transducer).
Figure 2A:
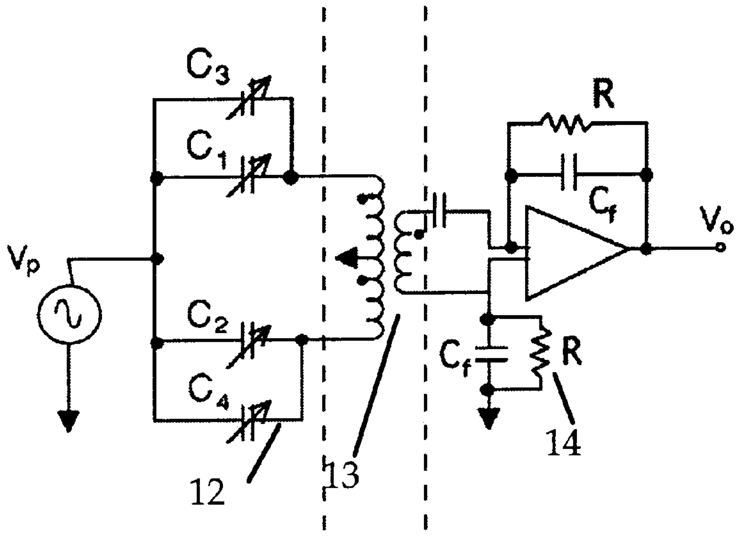
FIG. 2*a* is a circuit diagram of the capacitive pick-off.
Figure 2B:
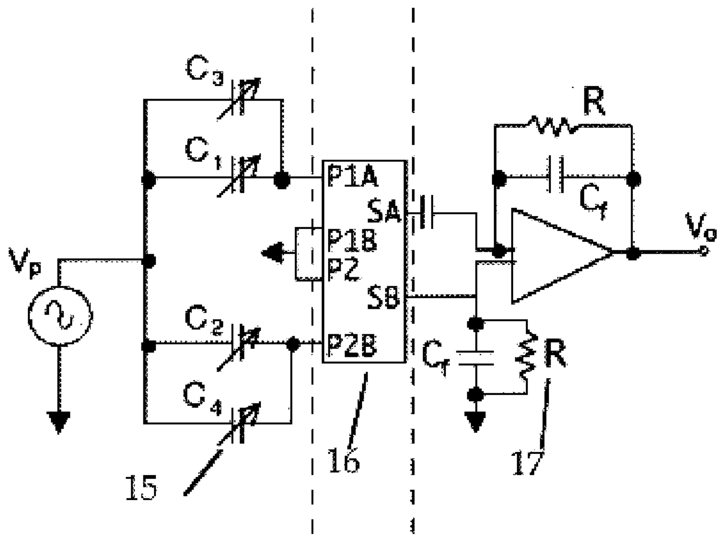
Figure 2b PRIOR ART
FIG. 2*b* is a circuit diagram of the capacitive pick-off with the planar DCT included.
Figure 3:
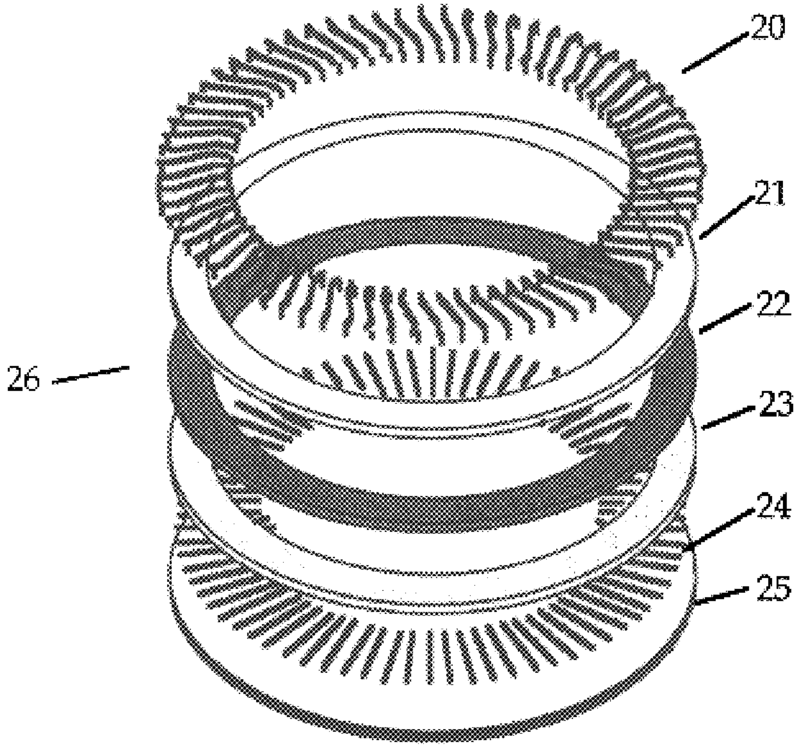
FIG. 3 is a blow-up of a planar, toroidal transformer fabricated using photolithography and additive processes.
Figure 4:
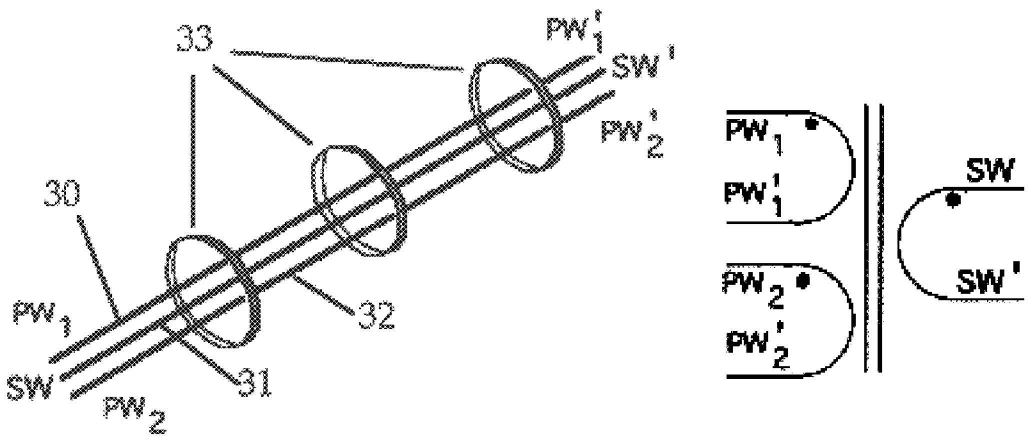
FIG. 4 is a schematic configuration of the DCT invention.

The invention encircles the conductors with the magnetic core. The concept is illustrated with FIG. 4 for a DCT. Three conductors form the Primary Windings, $PW_1$ 30 and $PW_2$ 32, and Secondary Winding, sw 31. All three are passed within (through) three circular cores 33 for this case.

Figure 5:
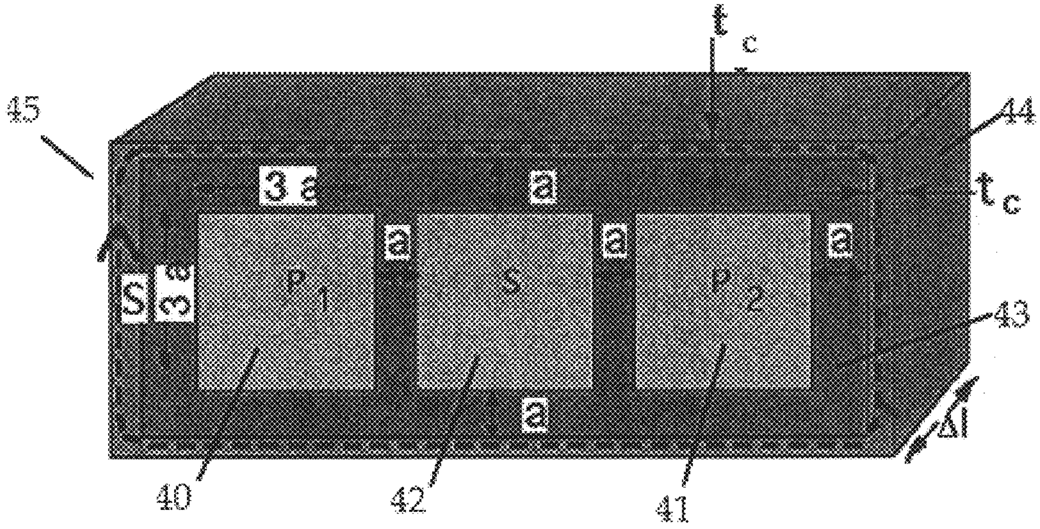
FIG. 5 is a conceptual cross-section of the transformer unit cell.

The planar design is shown in FIG. 5. It describes the cross-sectional view down the length of the transformer. It is referred to as a cell 45 as it possesses per unit length properties. It includes three conductors: two for the primary coils, $P_1$ 40 and $P_2$ 41 and one for the secondary, S 42. The conductors are separated by electrically-insulating material 43 and the whole assembly surrounded with magnetic core material 44. The parameter "a" gives a sense of relative dimensions. The magnetic core thickness is not characterized relative to the "a" dimension, however.

The dimensions of interest are: the magnetic circuit length, s, the thickness of the magnetic core, $t_c$, the conductor width, $3a$, and the separation between conductors, a.

The material properties of interest are the conductor resistivity, ρ, and the magnetic material permeability, $\mu$.

The frequency of operation is also important because it limits the thickness of the magnetic core to essentially the skin-depth due to eddy currents as described above.

The geometric parameters of the design are determined by the expected material properties and the operating frequency. Parameter values may change due to fabrication variances but their effects should be equal to all three conductors.

Analytically the inductance and Q for this design are derived as follows. The design describes a symmetric, closed magnetic circuit with length s. From Ampere's Law, the line integral of the magnetic field along the encircling core is equal to the current, i, that it encloses.

$$\oint \overline{H} \cdot d\overline{s} = Hs = i \tag{2}$$

The flux density, B, is related to H by $B=\mu_r\mu_o H$ where $\mu_r$ is the relative permeability and $\mu_o$ the initial permeability. The flux in the magnetic circuit is then given by the integral of the flux density $$\Phi = \int_A \overline{B} \cdot d\overline{A} = BA = Bt_c l_c \tag{3}$$

where $A=t_c l_c$ is the cross-sectional area which the flux crosses. The length, $l_c$ is into the page.

The inductance is given by the ratio of the flux linkage in the magnetic circuit divided by the current, i. Since the flux linkage for this design is equal to the flux, Φ, the inductance is given by $$L = \frac{\Phi}{i} \tag{4}$$

Using the results of the above expressions, the inductance can be written as $$L = \frac{\phi}{i} = \mu_r \mu_o \frac{t_c l_c}{s} \tag{5}$$

in terms of geometric parameters. We note that for this design, the inductance is the reciprocal of the reluctance.

The quality factor is given by $$Q = \frac{L\omega}{R_S + R_A} \tag{6}$$

where $R_s$ and $R_a$ are the transformer and amplifier resistances, respectively.

An interesting and convenient result for the Q of this design is observed when the quality factor expression is rewritten in terms of geometric parameters, assuming a negligible amplifier resistance. The Q relation becomes $$Q \cong \frac{9\mu_r \mu_o t_c a^2 \omega}{s\rho} \tag{7}$$

where the transformer resistance is replaced by $$R_S = \frac{\rho l_c}{9a^2} \tag{8}$$

The Q is independent of length, therefore the resistance and the inductance can be determined per unit length and the geometric parameters of interest are those of the cell cross-section.

The formulas above assume that the values for the thickness of materials (magnetic core and current carrying conductors) are less than the skin depth δ which is the depth of penetration of the electric and magnetic fields into a given material.

The skin depth δ is given by the formula $$\delta = \sqrt{\frac{2\rho}{\mu_r \mu_0 \omega}} \quad (9)$$

where $\mu_r$=relative permeability $\mu_0$=permeability of free space ($4\times10^{-7}$ Henries/meter)

ρ=resistivity (Copper $1.72\times10^{-8}$ ohms/meter)

ω=2πf (where f is the frequency of applied fields)

If the values for $t_c$ and 3*a* are substituted by the values of skin depths δ for the magnetic material and current conductors respectively at specific frequency f, the Q of the transformer windings is given by the formula $$Q=\tfrac{1}{6}\sqrt{\mu_r\rho_r} \quad (10)$$

where $\mu_r$=relative permeability of the magnetic material $\rho_r$=the ratio of the resistivity of the magnetic material to the resistivity of the current carrying conductor For a magnetic material such as permalloy with $\mu_r$=3600 and $\rho_r$=5 as compared to a copper conductor, $$Q=22.4 \quad (11)$$

For this case the ratio between the magnetic thickness $t_c$ to the conductor thickness 3*a*, $$\frac{t_c}{3a} = \frac{1}{\sqrt{\mu_r\rho_r}} = \frac{1}{\sqrt{3600*5}} = 0.0075 \quad (12)$$

$$t_c=0.224a \quad (13)$$

The equation number (10) indicates that at high frequencies a Q can be realized with magnetic materials with high permeabilities and low resistivities or low permeabilities and high resistivities.

The transformers are not constrained to the dimensional ratios considered above, but can be optimized for the application requirements.

Once the Q condition is met, the inductance can be set by the length of the transformer. The Q condition also determines whether laminations are necessary since the thickness of the core is specified. There is also a trade-off possibility between the conductor cross-section and the core thickness. A design with large conductor cross-section and thin magnetics is very practical since it is feasible to accomplish with low aspect ratio processing. Thin electrodeposited magnetics are available and better understood.

Saturation is a minor consideration since the currents are expected to be very small in the DCT for two reasons: (1) the pick-off differences the currents in the primaries yielding zero current at zero rotation of the tilting member and (2) gyros and accelerometers are to be operated in closed-loop mode (rotation at null). The core thickness is primarily set by the inductance requirement and not saturation.

Several other considerations which may impact the design are:

1. the choice of insulation material and spacing between conductors
2. the capacitance between the conductors which will define the self resonant frequency of the transformer
3. the effect of stress on permeability particularly from coupling to other materials
4. thermal sensitivity, and
5. matching between the primaries.

The resistance of the conductor lines must be extremely low, in order for the transformer to have a satisfactory Q-factor. This leads to two constraints: a geometric one in which relatively thick electroplated lines are required and a material one in which the resistivity of the lines must be as low as possible. Ordinarily this latter constraint would dictate the use of the highest conductivity material available, i.e., silver; copper is also an attractive alternative due to its much lower cost. Other materials may be suitable.

The reluctance of the magnetic path must be extremely low, in order for the transformer to maximize inductance. The magnetic material selected for the cores must be of extremely high permeability. In addition, there must be no blockage of the flux path by intervening nonmagnetic layers, such as seed layers which would otherwise normally be used for the electrodeposition.

Magnetic materials may include electrodeposited permalloy (NiFe 80/20). A potentially higher permeability alloy reported in the literature is based on the addition of small amounts of molybdenum in the nickel-iron alloy (NiFeMo, or Supermalloy).

Figure 6:
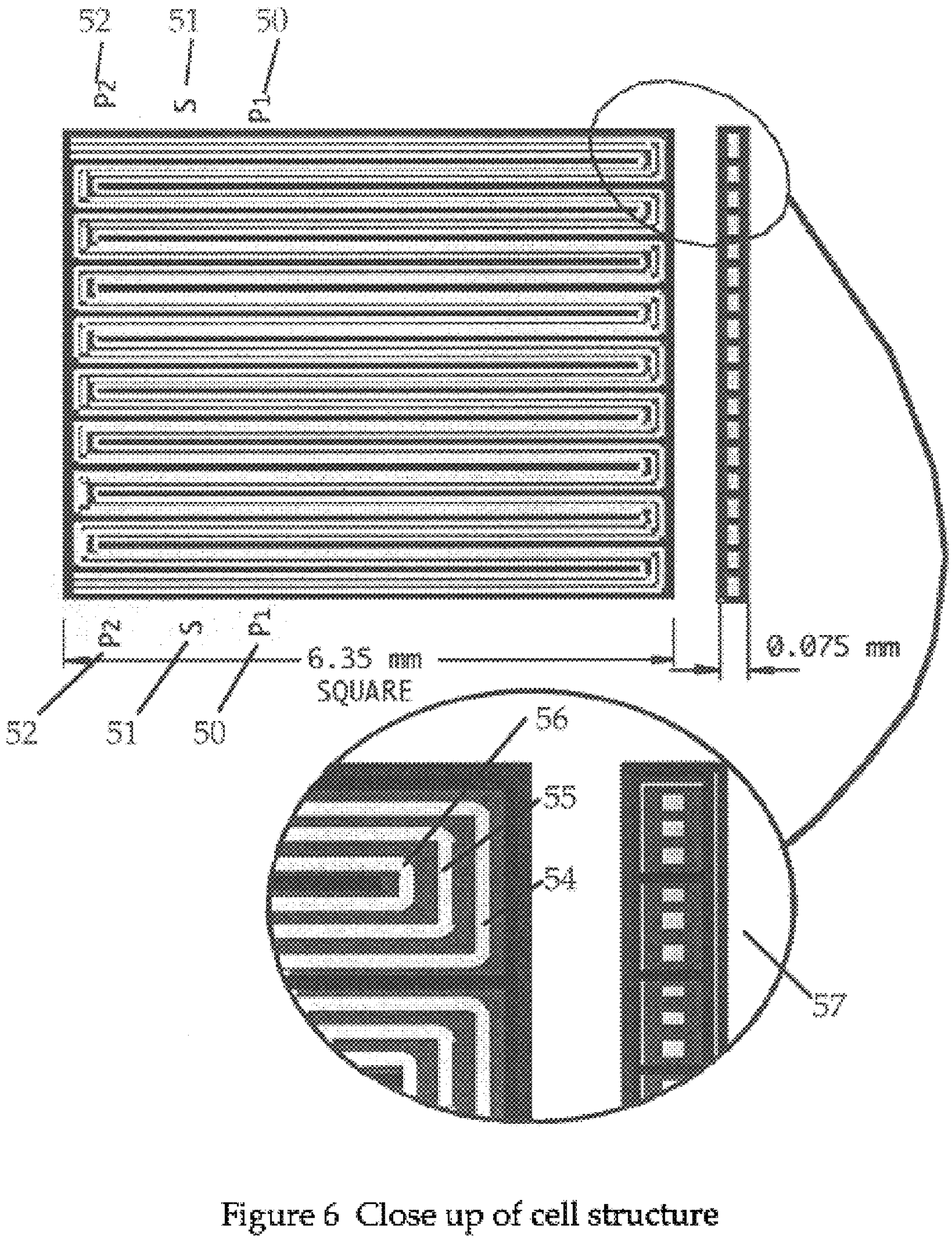
FIG. 6 is a conceptual rendition of the DCT transformer meandered to form a planar square arrangement.

A top view of the DCT 53 is shown in FIG. 6 for a square device shape. The DCT is shown to meander back and forth to achieve the desired length. The thin side view 57 is as shown. The connections to the DCT and electronics can be made at the indicated pads 50, 51, 52. In the meander detail shown as a blown up are indicated one primary 56, the second primary 54 and the secondary 55. The DCT is not limited to the square shape, however, and can in fact meander and form any shape and can occupy available spaces. The meander can also continue to where it is most convenient to connect to the device and the electronics separately.

The DCT can be formed onto sensor parts directly or fabricated onto a separate substrate and placed next to the transducer on the part. It can also be formed as a separate device which can be integrated with electronics.

Figure 7:
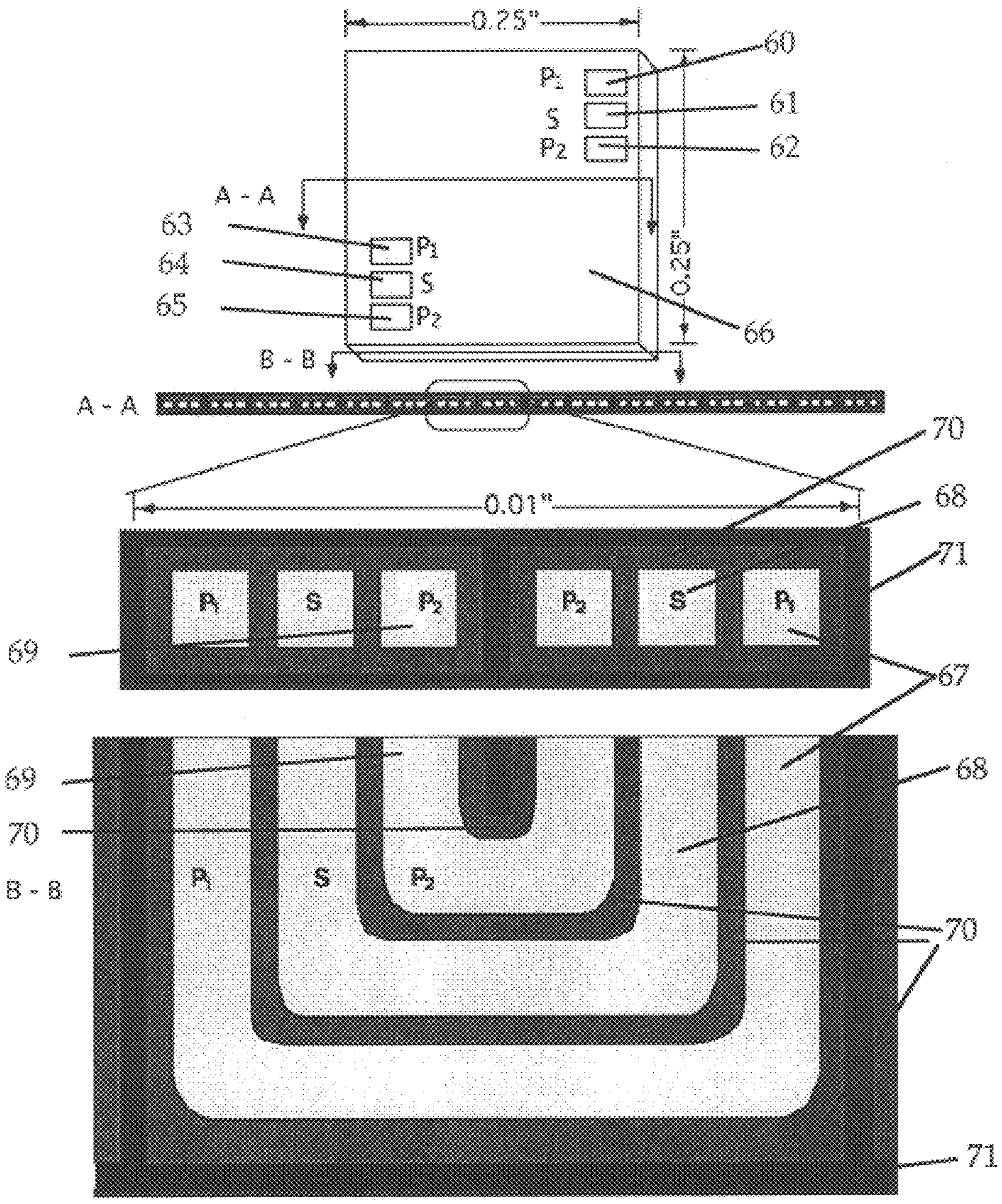
FIG. 7 is a rendition of the DCT including top and cross-sectional, side views.

FIG. 7 gives an amplified view of the parts at an end-view and relates them to the cross-section. A final device flat DCT chip is also shown 66. The connecting pads 60, 61, 62, 63, 64, 65 are located as shown. It contains one primary 67, a secondary 68 and a second primary 69. A magnetic material 71 surrounds them. All four are separated by an insulator 70.

An obvious advantage to this invention is that unity coupling is guaranteed; that is, the same magnetic core segment encircles all three conductors guaranteeing that all three will see the same flux and hence the coupling is 1. Eddy currents are reduced because the magnetic enclosure can be made as thin as required. If necessary a number of thin laminations can easily be made using the electroplating process if a higher Q is required. The inductance can be varied by varying the length of the winding and changing the chip size. If space is limited, planar transformers can be stacked vertically to achieve the required inductance.

The MilliDCT is a naturally planar design that is much less complex to fabricate than the usual toroidal form which requires high precision, high aspect ratio techniques for forming multi-conductor turns about a core.

Several benefits of the novel MilliDCT are listed:

a. Low aspect ratio fabrication technology is sufficient.
b. The conductors are continuous in the plane.
c. The magnetic material is expected to be thin and is within fabrication capability; thick depositions are not needed.
d. Matching between primaries is a by-product of the design.

e. The magnetic field is contained, eliminating flux leakage.

f. Coupling between conductors is unity by geometry.

g. The Q and inductance of the MilliDCT or other transformer can be determined per unit length; the total inductance can be set with the length of the transformer.

h. The design is linear and is not restricted to a particular geometry and can in fact be shaped to conform to spaces available around other components.

In general the planar design favors conductors with large cross-section for reducing the resistance and thin magnetics, reducing the need for laminations.

The invention provides greater design flexibility.

Ferrite-filled polymers would be an attractive material since laminations would not be required due to its high resistivity.

Other Magnetic Components

Figure 8:
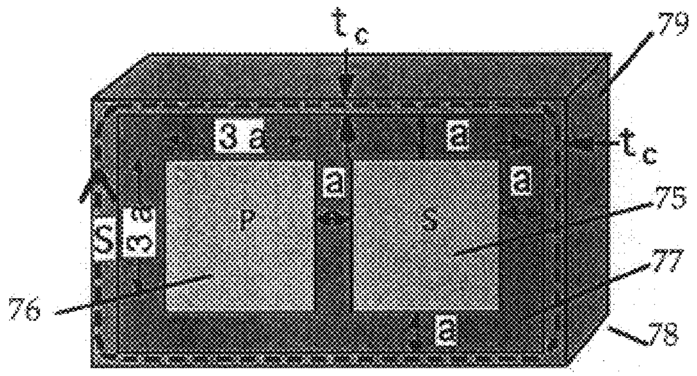
FIG. 8 shows the end view of a unit length of a two conductor transformer; both conductors are single turn.
Figure 9:
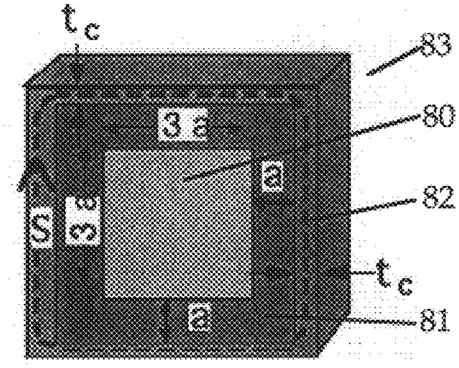
FIG. 9 shows the end view of a unit length of an inductor; conductor is of a single turn.

In addition to the differential current transformer, the planar process described can be used for making other magnetic components such as one to one transformers and inductors as shown in FIG. 8 and FIG. 9.

The calculations for the One-to-One transformer model 78 shown in FIG. 8 are:

$$L = \frac{\mu_r \mu_0 t_c l_c}{36a + 2t_c} \quad (14)$$

$$R = \frac{\rho l_c}{9a^2} \quad (15)$$

$$C_{\mu s} = 7.5\epsilon_r \epsilon_0 1_c \quad (16)$$

A unit length of the one-to-one transformer shown from the end view features a single turn primary conductor 76 and a single turn secondary conductor 75. An insulator 77 separates the conductors. A magnetic material 79 encircles the insulator and conductors.

The calculations for the Inductor model 83 shown in FIG. 9 are:

$$L = \frac{\mu_r \mu_0 t_c l_c}{20a + 2t_c} \quad (17)$$

$$R = \frac{\rho l_c}{9a^2} \quad (18)$$

$$R = \rho 1_c / 9a^2 \quad (19)$$

$$C = 12\epsilon_r \epsilon_0 1_c \quad (19)$$

A unit length of the inductor shown from the end view features a single turn conductor 80 encircled by an insulator 81. Both 80 and 81 are encircled by the magnetic material 82.

The transformers and inductors are not constrained to the dimensional ratios shown, but can be optimized for the application requirements. The capacitance calculations described are for devices where the magnetic materials are highly conductive, for low conductive materials such as ferrite filled polymers the capacitances would be much smaller. These planar designs allow for well defined electrical characteristics as a function of geometry and material characteristics.

Fabrication Process Description

A fabrication process for the millimachined differential current transformer (MilliDCT) is based on the successive application of patterning by photolithography and through-mold electroforming.

Figure 10A:
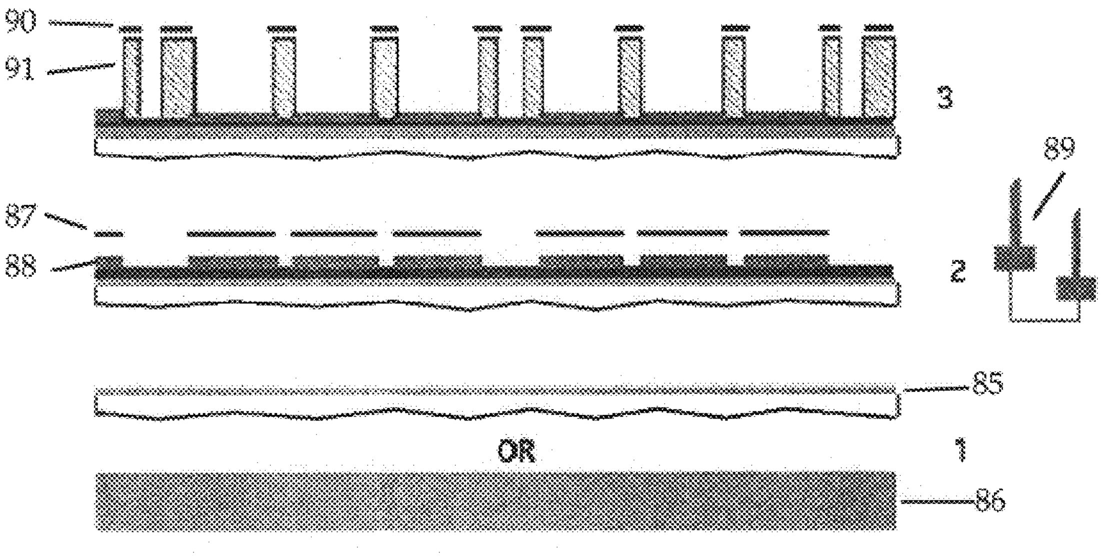
FIGS. 10*a*–10*c* show a fabrication sequence for the defferential current transformer.
Figure 10B:
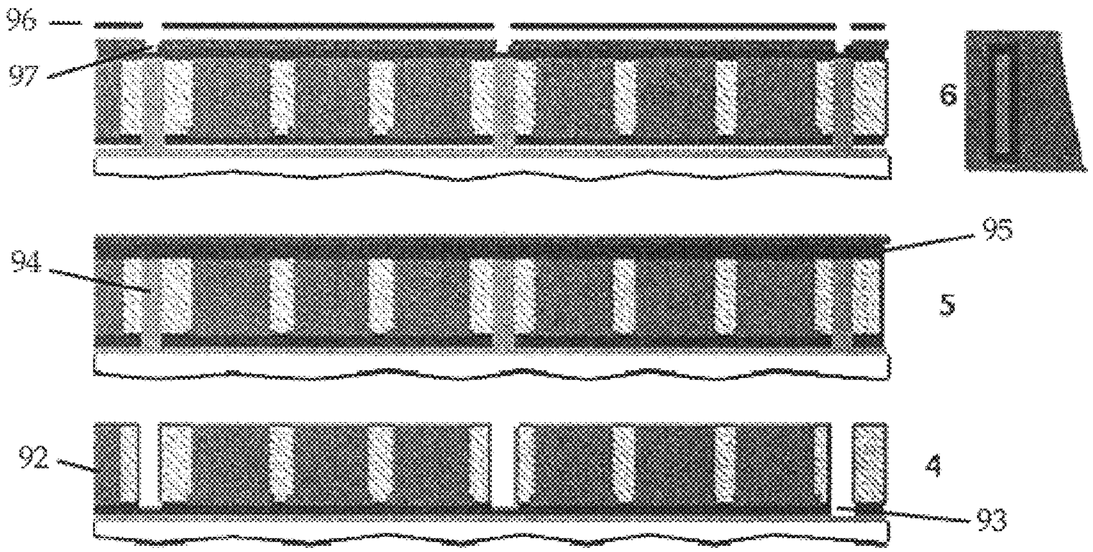
Figure 10C:
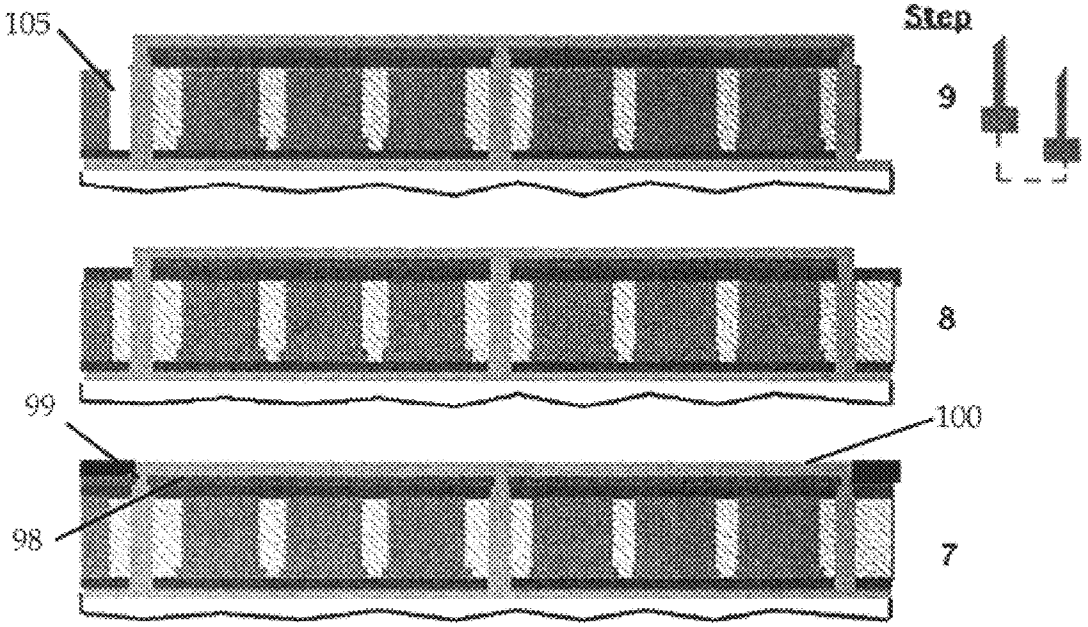

A fabrication sequence for the differential current transformer is given below and illustrated in FIGS. 10*a*–10*c*. Other variations are possible.

(Step 1) Two choices of substrate are possible: either a highly permeable material 85(e.g., a supermalloy wafer or sheet); or a substrate 86 onto which supermalloy can be deposited to form the lower magnetic core.

(Step 2) The lower magnetic core is coated with a thin (5 microns) layer of insulating material, such as polyimide, followed by a sputtered seed layer of copper. Photoresist is then applied and exposed with Mask 1 87. The resulting pattern allows a deposition of a 'mesh-type' seed layer on the insulating film 88 for the deposition of conductor lines (electrodeposition is preferred over electroless deposition here due to the improved electrical properties of electrodeposited films). The connector mesh lines 89 connect the separate devices and test structures on the wafer.

(Step 3) A thick layer of high-aspect-ratio photodefinable material, such as SU-8-based epoxy, is then deposited and patterned with Mask 2 90, to form the conductor molds 91 and necessary molds 91 for the magnetic side cores.

(Step 4) The conductors 92 are electroformed into the plating molds, (note at this point the electrical contact for the magnetic side cores are covered with the first insulating material; thus, no electrodeposition occurs in these molds). The insulating polyimide 93 at the bottom of the magnetic side core molds is then selectively removed using a reactive ion etch in preparation for deposition.

(Step 5) The magnetic side cores 94 are now electroplated using either permalloy or supermalloy. The entire structure is then passivated using an insulating material 95 such as preimidized polyimide, over which a magnetic seed layer is then sputter deposited.

(Step 6), Photoresist is then applied to the magnetic seed layer, patterned and etched using Mask 3 96 to expose the preimidized polyimide. The seed layer is now used as the mask to open the preimidized polyimide using a plasma etch to allow access to the magnetic side cores. This allows the formation of magnetic vias 97 between the magnetic side core and the magnetic upper core with deposited supermalloy.

(Step 7) A polymeric plating mold is then deposited and patterned, and the upper magnetic core of supermalloy is deposited in a two step process. First the lower magnetic core is connected to a voltage source, and the magnetic upper side core 99 is deposited. Next the magnetic upper seed layer is connected to a voltage source, and the magnetic upper core 100 is deposited to complete the uniting of the upper and lower magnetic cores of the transformer.

(Step 8) The polymeric plating mold is removed, and the seed layer beneath the polymeric plating mold is etched, separating the magnetic core and completing the magnetic circuit.

(Step 9) To complete the device, the wafer is blanket etched in an oxidizing plasma to remove the polymers in the fields 105 (the magnetic core itself will shield the polymer internal to the device during this etch; the exposed conductor lines where the pads are will shield the polymer underneath them thus remaining supported by that polymer). Finally, to complete the device, the mesh-connector lines which are exposed during the blanket etch, are etched to electrically isolate the conductor lines of the different devices and test structures.

Silicon wafers are an obvious choice for the substrate since they have a polished, flat surface, mechanical stability, and compatibility with Silicon-based gyros and accelerometers being developed by Millimachining and MEMS. In addition, the separate components can be easily diced.

The component fabrication is not restricted to Silicon, however, and the prospect of forming the component directly onto parts made of other materials may be desirable for some applications.

What is claimed is:

1. An angle measurement instrument for a rotating member having opposing flat faces, comprising:

a first pair of capacitive sensors proximate one face of said rotating member;

a second pair of capacitive sensors proximate the other face of said rotating member;

a planar differential current transformer proximate one pair of capacitive sensors, comprising:

two primary conductors, each comprising a single winding;

at least one secondary conductor comprising a single winding; and a single magnetic core member surrounding said primary conductors and said secondary conductor;

means for electrically connecting one capacitive sensor from each pair in parallel to one primary conductor;

means for electrically connecting the other capacitive sensor from each pair in parallel to the other primary conductor; and means for determining from the secondary conductor, the differential currents in the primary conductors, as a measure of the angle of said rotating member to said capacitive sensors.

2. An elongated, planar, generally linear electrical inductive component, comprising:

at least one conductor, each conductor defining a unique conductive path;

a magnetic member co-linear with all conductors along the entire component length, and completely surrounding all conductors; and an insulator separating each conductor from any other conductor and from the magnetic member;

wherein at any location along the length of the component, in cross section the component includes only one conductor for any conductive path, and the cross section is uniform with length.

3. The component of claim 2 comprising a single conductor, to accomplish an inductor.

4. The component of claim 2 comprising two co-linear conductors, to accomplish a transformer.

5. The component of claim 2 comprising three co-linear conductors, to accomplish a differential transformer.

6. The component of claim 2 wherein the magnetic member and all conductors meander through a plurality of turns, to increase the component's effective length.

7. An angle measurement instrument for determining the angle of a rotating member having opposed faces, relative to fixed members comprising opposing, non-rotating flat faces, comprising:

a first pair of capacitive sensor plates fixed to one flat face proximate one face of said rotating member, a second pair of capacitive sensor plates fixed to the second flat face proximate the other face of said rotating member, wherein the rotating member rotates to change the gap between the rotating member and the fixed members;

a planar differential current transformer comprising:

a first conductor comprising one primary carrying current from one set of capacitive sensors;

a second conductor comprising a second primary carrying current from a second set of capacitive sensors, the sense of the second current being opposite that of the first current;

a third conductor comprising a secondary carrying a current proportional to the difference between the first and second currents that vary in proportion to the motion of the rotating member;

a magnetic core co-linear with and completely surrounding the conductors and whose length along the conductors determines the transformer length;

an insulator separating each conductor from any other conductor and all conductors from the magnetic core;

wherein the properties of the transformer are obtained by establishing unit length properties and meandering the single conductors with encircling magnetic core to the desired length;

wherein at any location along the length of the transformer, in cross section the transformer includes only one conductor for any conductive path, and the cross section is uniform with length;

means for electrically connecting one capacitive sensor from each pair in parallel to one primary conductor;

means for electrically connecting the other capacitive sensor from each pair in parallel to the other primary conductor; and means for determining from the third conductor, the differential currents in the primary conductors, as a measure of the angle of said rotating member to said capacitive sensors.

8. An angle measurement instrument for determining the angle of a rotating member having opposed faces, relative to fixed members comprising opposing, non-rotating flat faces, comprising:

a first pair of capacitive sensor plates fixed to one flat face proximate one face of said rotating member, a second pair of capacitive sensor plates fixed to the second flat face proximate the other face of said rotating member, a planar differential current transformer comprising:

a first conductor comprising one primary carrying current from one set of capacitive sensors;

a second conductor comprising a second primary carrying current from a second set of capacitive sensors, the sense of the second current being opposite that of the first current;

a third conductor comprising a secondary carrying a current proportional to the difference between the first and second currents that vary in proportion to the motion of the rotating member;

a magnetic core co-linear with and completely surrounding the conductors and whose length along the conductors determines the transformer length;

an insulator separating each conductor from any other conductor and all conductors from the magnetic core;

wherein the properties of the transformer are obtained by establishing unit length properties and meandering the single conductors with encircling magnetic core to the desired length;

wherein at any location along the length of the transformer, in cross section the transformer includes only one conductor for any conductive path, and the cross section is uniform with length;

means for electrically connecting one capacitive sensor from each pair in parallel to one primary conductor;

means for electrically connecting the other capacitive sensor from each pair in parallel to the other primary conductor; and means for determining from the third conductor, the differential currents in the primary conductors, as a measure of the angle of said rotating member to said capacitive sensors.

9. A translation measurement instrument for determining movement of a moving member having opposed faces, relative to fixed members comprising two opposing, fixed flat faces, comprising:

a first pair of capacitive sensor plates fixed to one flat face proximate one face of said moving member, a second pair of capacitive sensor plates fixed to the second flat face proximate the other face of said moving member;

wherein the moving member moves to vary the gap between the moving member and the fixed members;

a planar differential current transformer comprising:

a first conductor comprising one primary carrying current from one set of capacitive sensors;

a second conductor comprising a second primary carrying current from a second set of capacitive sensors, wherein the sense of the second current is opposite that of the first current;

a third conductor comprising a secondary carrying a current proportional to the difference between the first and second currents that vary in proportion to the motion of the moving member;

a magnetic core co-linear with and completely surrounding the conductors and whose length along the conductors determines the transformer length;

an insulator separating each conductor from any other conductor and all conductors from the magnetic core;

wherein the properties of the transformer are obtained by establishing unit length properties and meandering the single conductors with encircling magnetic core to the desired length;

wherein at any location along the length of the transformer, in cross section the transformer includes only one conductor for any conductive path, and the cross section is uniform with length;

means for electrically connecting one capacitive sensor from each pair in parallel to one primary conductor;

means for electrically connecting the other capacitive sensor from each pair in parallel to the other primary conductor; and means for determining from the third conductor, the differential currents in the primary conductors, as a measure of the translation distance of said moving member to said capacitive sensors.

10. A translation measurement instrument for determining movement of a moving member having opposed faces, relative to fixed members comprising opposing, fixed flat faces, comprising:

a first pair of capacitive sensor plates fixed to one flat face proximate one face of said moving member, a second pair of capacitive sensor plates fixed to the second flat face proximate the other face of said moving member, wherein the moving member moves relative to the fixed members;

a planar differential current transformer comprising:

a first conductor comprising one primary carrying current from one set of capacitive sensors;

a second conductor comprising a second primary carrying current from a second set of capacitive sensors, wherein the sense of the second current is opposite that of the first current;

a third conductor comprising a secondary carrying a current proportional to the difference between the first and second currents that vary in proportion to the motion of the translating member;

a magnetic core co-linear with and completely surrounding the conductors and whose length along the conductors determines the transformer length;

an insulator separating each conductor from any other conductor and all conductors from the magnetic core;

wherein the properties of the transformer are obtained by establishing unit length properties and meandering the single conductors with encircling magnetic core to the desired length;

wherein at any location along the length of the transformer, in cross section the transformer includes only one conductor for any conductive path, and the cross section is uniform with length;

means for electrically connecting one capacitive sensor from each pair in parallel to one primary conductor;

means for electrically connecting the other capacitive sensor from each pair in parallel to the other primary conductor; and means for determining from the third conductor, the differential currents in the primary conductors, as a measure of the translation distance of said moving member to said capacitive sensors.

11. A method of fabricating an elongated, planar, generally linear electrical inductive component by multi-layered fabrication, the component having at least one conductor, each conductor in the component defining a unique conductive path, a magnetic core co-linear with all conductors along the entire component length, and completely surrounding all conductors, and an insulator separating each conductor from any other conductor and all conductors from the magnetic core member, wherein at any location along the length of the component, in cross section the component includes only one conductor for any conductive path, and the cross section is uniform with length, the method comprising:

providing a lower layer of magnetic core material;

layering on top of the lower layer of magnetic core material, a second layer comprising a bottom insulator and first vertical segments of the magnetic core; wherein the first vertical segments of the magnetic core are in contact with the lower layer of magnetic core material;

layering on top of the second layer, a third layer comprising conductors and insulators, bounded on each side in the plane by second vertical segments of the magnetic core, the conductors separated from each other and from the second magnetic core vertical segments by a vertical insulator segment; wherein the second vertical segments of the magnetic core are located directly above and in contact with the first vertical segments of the magnetic core of the second layer;

layering on top of the third layer, a fourth layer comprising a top insulator and third vertical segments of the magnetic core, the third vertical segments of the magnetic core located directly above and in contact with the second vertical segments of the magnetic core;

layering on top of the fourth layer, a fifth layer comprising a top layer of magnetic core material that is in contact with the third vertical segments of the magnetic core.

12. The method of claim 11 comprising one conductor to accomplish an inductor.

13. The method of claim 11 comprising two co-linear conductors, each conductor defining a unique path, to accomplish a transformer.

14. The method of claim 11 comprising three co-linear conductors, each conductor defining a unique path, to accomplish a differential current transformer, wherein one conductor comprises one primary, the second conductor comprises a second primary and the third conductor comprises the secondary.

15. The method of claim 11 wherein the method of fabrication is by sequential deposition.

16. The method of claim 15 wherein the deposition comprises in part electroplating.

17. The method of claim 11 wherein the method of fabrication is by the stacking and bonding of multiple layers formed separately.

* * * * *